Patented Feb. 14, 1933

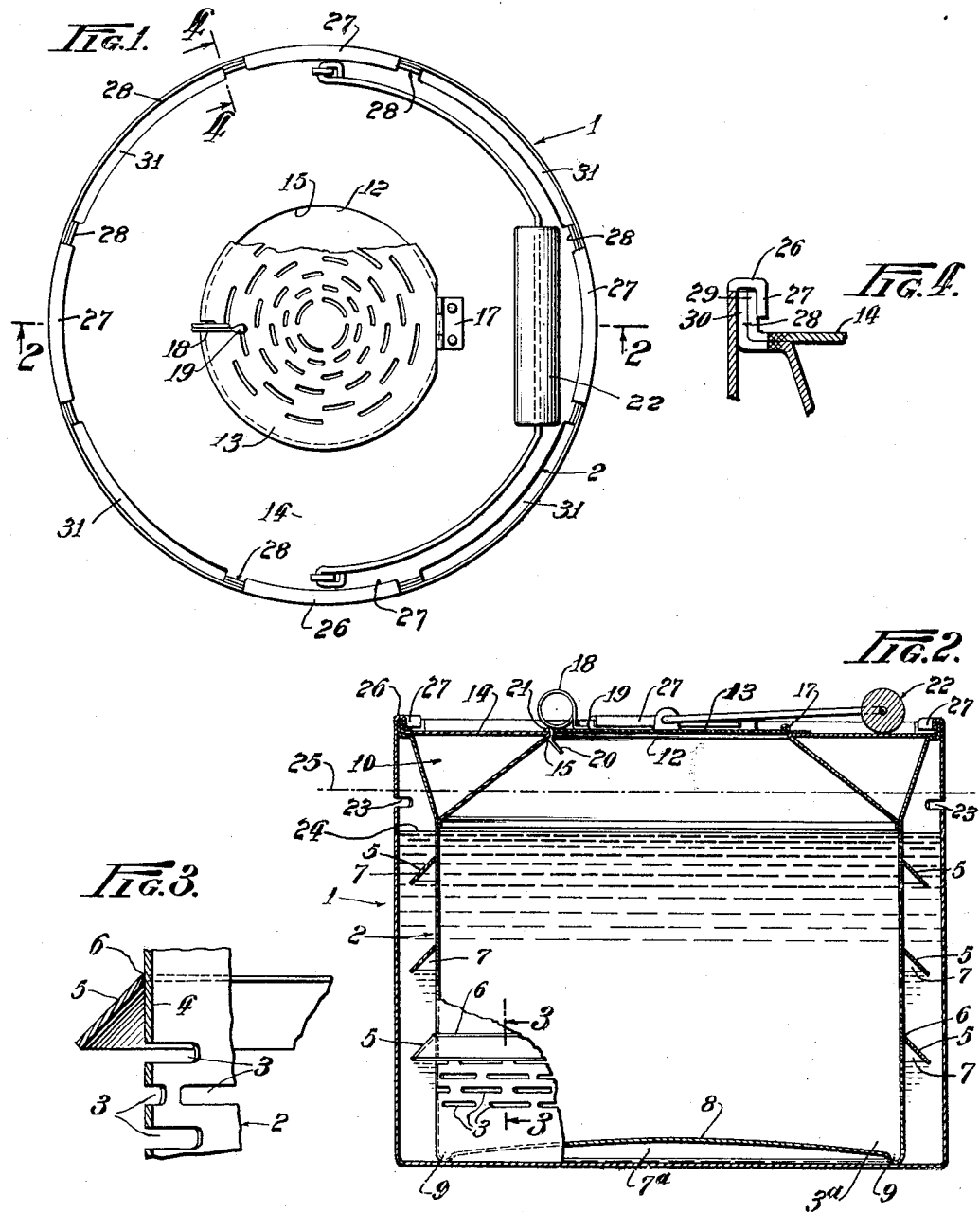

1,897,571

UNITED STATES PATENT OFFICE

ENEA CAMPORINI, OF CHICAGO, ILLINOIS

BAIT BUCKET

Application filed October 24, 1930. Serial No. 490,971.

This invention relates to improvements in bait buckets and it consists of the matters hereinafter described and more particularly pointed out in the appended claims.

The primary object of the invention is to provide a bait bucket for effectively supplying the water therein with oxygen for the purpose of sustaining animal life within said water for considerably longer periods of time than has heretofore been possible.

Another object of the invention is to provide a bucket of this kind which is light, compact and efficient, and which may be manufactured at a substantially low cost.

Other objects of the invention, as well as the many advantages thereof, will appear as I proceed with the specification.

In the drawing:

Fig. 1 is a top plan view of the bait bucket.

Fig. 2 is a vertical cross sectional view as taken on the line 2—2 of Fig. 1.

Fig. 3 is an enlarged detail vertical sectional view on a larger scale as taken on line 3—3 of Fig. 2.

Fig. 4 is a detailed sectional view on a larger scale taken on line 4—4 of Fig. 1.

In general, my invention includes an inner perforated container, which I have termed the "live box" and which is provided with a plurality of air pockets or traps spaced vertically thereon, said container being adapted to be engaged within an outer container partially filled with water so as to provide air traps below the surface of said water, thereby greatly increasing the contact surface of the water with the air from which the water absorbs oxygen as it is consumed by the live bait within the inner container.

I prefer to use a cylindrical outer container 1 of a light gauge galvanized sheet metal. The live box 2 is also substantially cylindrical and has alternating perforated and unperforated annular band portions 3 and 4 respectively, spaced vertically of the side wall of said live box. Overhanging each of said unperforated band portions on the outside thereof 4 is a metal flange 5 suitably secured at its upper and inner periphery, as by welding as indicated at 6, to the upper part of each of said band portions 4. Each flange 5 extends outwardly and downwardly from the associated line of welding 6 and terminates in a plane slightly below that of the upper part of the perforated portion 3 below the same.

It will be noted that the band portions 4 and the flanges 5 coact in forming vertically spaced inverted V shaped annular air traps 7 about the live box 2. The bottom 8 of said live box is formed convex and has a bead 9 along its lower periphery for strengthening. The bottom 8 also forms an additional air pocket 7ª to still further increase the surface area of the contact between the air and water.

The bottommost perforated band portion 3 is spaced from the bottom 8 so as to leave an unperforated portion 3ª adapted to hold water. This allows the removal of the live box 2 from the outer container 1 without injuring the aquatic animal life within said live box through exposure to the air.

In the upper portion of the live box is an air chamber 10 for the purpose of keeping the device afloat as it is generally desirable to do when fishing from a boat or while wading. Said air chamber 10 is fixed to the inner periphery of the live box 2 so as to define an axial opening 12 adapted to be closed by a perforated cover 13. The upper portion of said air chamber 10 forms the top wall 14 of the live box. The cover 13 is preferably hinged to the said top wall 14 by means of hinges 17. Diametrically opposite said hinges 17 and also fixed to cover 13, is a spring snap latch 18 which serves as a means for opening the cover 13 and also serves to retain it in a closed position.

The snap latch 18 is formed of two coils of spring wire with one end fixed to the cover 13 as indicated at 19, and the other end 20 extending downwardly through slot 21 in said cover to operatively engage the rim 15 of opening 12. A single bail 22 is pivoted to the top wall 14 in any well known manner for convenience in carrying my improved live bait bucket.

A suitable number of apertures 23 are formed in the outer container 1, slightly above the usual water level 24 within the bait bucket, but below the level of the water, indicated approximately by dot and dash line 25, when the device is afloat.

The top marginal portion 26 of the outer container 1 is turned inwardly and downwardly as best shown in Fig. 4 to form annularly spaced hook flanges 27. Formed so as to be engaged by hook flanges 27 on container 1, and annularly spaced on the upper portions of the live box 2, are upright flanges 28. Said flanges, which are formed by coacting marginal portions 29 and 30 respectively, on the top wall 14 and the side wall of the live box, are adapted to be engaged by and locked within or under hook flanges 27 on the container 1, upon a relative turning between the said outer container and the live box.

Through the perforations 23 in the upper portion of the container 1, any excess water may be readily removed. The air is always free to circulate through said perforations as well as through annular openings 31 between the top wall 14 and the outer container 1.

It is a well known fact that any sudden change in temperature has a very detrimental effect on the life of live bait in general and particularly upon the life of small fish of the type generally used as bait. It is also well known that aquatic animal life breathes the air absorbed by the water while it is in contact with the air.

It will be noted that in my improved live bait bucket I utilize the same water to which the live bait has already become accustomed, by simply floating both inner and outer containers upon the waters to be fished.

However, it is at times, necessary to keep the bait alive without the addition of any water whatsoever. In my improved bait bucket this may be readily accomplished by re-aerating the water therein through removing the bait box from the outer container, thereby replenishing with fresh air the air traps on said bait container and then replacing it within said outer container. During the short period of time required to renew the air in said air traps the unperforated portion 3ª of the live box will hold enough water to keep the live bait from being exposed to contact with the air.

I am aware that the air traps could be replenished with fresh air by other means than those shown and described and that my device may be manufactured in various other manners, and therefore, do not wish to be limited to the construction shown except as may be provided specifically in the appended claims.

I claim as my invention:

1. In a live bait bucket, an outer water container, an inner bait container and means providing vertically spaced air pockets on one of said containers below the normal water level in said water container.

2. A live bait bucket which consists of an outer water container, an inner bait container, and means providing a plurality of vertically spaced air traps on said bait container below the surface of the water in said containers.

3. In a live bait bucket, an outer water container, an inner perforated bait container, flanged means on said bait container forming air traps below the water level in said containers.

4. In a live bait bucket the combination of an outer water container, an inner perforated floatable bait container in said water container and having air traps along the side thereof, and coacting means on each of said containers which retains them in a fixed relation to each other so as to maintain said traps sealed by the water in said containers and from which said water will absorb oxygen at different levels in said water.

5. In a live bait bucket an outer partially perforated water container, an inner perforated bait container with air traps thereon, there being an opening therein normally closed by a cover, hook means on one of said containers coacting with cam means on the other container for locking them together said hook means and cam means being engageable and disengageable upon a relative turning movement between said containers.

6. In a live bait bucket, an outer water container, an inner bait container having openings in its side for the admission of water thereinto and means on said side of said bait container forming air traps below the normal level of the water in said water container.

7. In a live bait bucket, an outer water container, an inner bait container of a diameter smaller than that of the water container so as to provide an annular space therebetween and which bait container has openings therein, and means on one of said containers and disposed in said annular space for forming air traps below the normal level of the water in the water container.

8. In a live bait bucket, an outer water container, an inner bait container of a diameter smaller than that of the water container so as to provide an annular space therebetween and which bait container has openings therein, and downwardly and outwardly projecting members carried on the outside of the bait container for forming air traps in said annular space below the normal level of the water in the water container.

9. In a device of the kind described, a water container and means removable therefrom and formed to provide vertically spaced air traps in the water in said container when said means is disposed in said container.

10. In a device of the kind described, an open top water container and a member insertable into and removable from the open top of said water container and means on said member providing air pockets in said water when said member is disposed in said container.

In testimony whereof, I have hereunto set my hand, this 22nd day of October, 1930.

ENEA CAMPORINI.